(12) United States Patent
Kahng et al.

(10) Patent No.: US 10,687,119 B2
(45) Date of Patent: Jun. 16, 2020

(54) SYSTEM FOR PROVIDING MULTIPLE VIRTUAL REALITY VIEWS

(71) Applicant: Samsung Electronics Co., Ltd, Suwon-si (KR)

(72) Inventors: Jonghyun Kahng, Palo Alto, CA (US); Seokhyun Yoon, Cupertino, CA (US)

(*) Notice: Subject to any disclaimer, the term of this patent is extended or adjusted under 35 U.S.C. 154(b) by 146 days.

(21) Appl. No.: 15/719,389

(22) Filed: Sep. 28, 2017

(65) Prior Publication Data
US 2018/0376217 A1    Dec. 27, 2018

Related U.S. Application Data

(60) Provisional application No. 62/525,654, filed on Jun. 27, 2017.

(51) Int. Cl.
*H04N 21/482* (2011.01)
*H04N 5/232* (2006.01)
(Continued)

(52) U.S. Cl.
CPC ....... *H04N 21/482* (2013.01); *H04N 5/23238* (2013.01); *H04N 5/247* (2013.01);
(Continued)

(58) Field of Classification Search
CPC ............... H04N 21/482; H04N 13/117; H04N 21/2187; H04N 21/23439;
(Continued)

(56) References Cited

U.S. PATENT DOCUMENTS 7,196,722 B2   3/2007  White et al.
9,182,598 B2   11/2015 Sako et al.
(Continued)

FOREIGN PATENT DOCUMENTS

KR  10-2001-0097517 A   11/2001
KR  10-2009-0068711 A   6/2009
KR  10-2012-0035286 A   4/2012

OTHER PUBLICATIONS

MathWorks; "Motion-Based Multiple Object Tracking"; https://www.mathworks.com/help/vision/examples/motion-based-multiple-object-tracking.html?s_tid=gn_loc_drop; 9 pages.
(Continued)

*Primary Examiner* — Junior O Mendoza
*Assistant Examiner* — Aklil M Tesfaye

(57) ABSTRACT

An apparatus, method, and computer readable medium for a virtual reality (VR) client and a contents server for live virtual reality events are provided. The contents server receives feeds from each 360° camera at a venue. The contents server transmits a primary first 360° video in a first stream and converted secondary non-360° videos in a second stream to a VR client. The VR client determines relative positions of each non-360° video in order to display rendered thumbnails of the non-360° videos in the first 360° video. The VR client transmits a selection of a non-360° video to the contents server. The contents server transmits the second 360° video related to the selection in a first stream and the converted first non-360° video in the second stream.

32 Claims, 10 Drawing Sheets

(51) Int. Cl.
| | |
|---|---|
| H04N 21/414 | (2011.01) |
| H04N 21/2343 | (2011.01) |
| H04N 21/2187 | (2011.01) |
| H04N 13/117 | (2018.01) |
| H04N 21/218 | (2011.01) |
| H04N 21/81 | (2011.01) |
| H04N 21/6587 | (2011.01) |
| H04N 21/4725 | (2011.01) |
| H04N 21/858 | (2011.01) |
| H04N 5/247 | (2006.01) |
| H04N 13/332 | (2018.01) |

(52) U.S. Cl.
CPC ....... *H04N 13/117* (2018.05); *H04N 21/2187* (2013.01); *H04N 21/21805* (2013.01); *H04N 21/23439* (2013.01); *H04N 21/41407* (2013.01); *H04N 21/4725* (2013.01); *H04N 21/6587* (2013.01); *H04N 21/816* (2013.01); *H04N 21/8583* (2013.01); *H04N 13/332* (2018.05)

(58) Field of Classification Search
CPC ......... H04N 21/41407; H04N 5/23238; H04N 13/332; H04N 21/816; H04N 21/21805; H04N 21/8583; H04N 21/4725; H04N 21/6587; H04N 5/247
See application file for complete search history.

(56) References Cited

U.S. PATENT DOCUMENTS

| | | | |
|---|---|---|---|
| 9,201,470 B2 | 12/2015 | Kim et al. | |
| 9,686,466 B1 | 6/2017 | Billinghurst et al. | |
| 9,881,584 B2* | 1/2018 | Dakss | G09G 5/006 |
| 10,325,391 B2* | 6/2019 | Forutanpour | G06F 3/013 |
| 2010/0080418 A1 | 4/2010 | Ito | |
| 2011/0283223 A1 | 11/2011 | Vaittinen et al. | |
| 2012/0019619 A1* | 1/2012 | Suh | H04N 19/597 348/43 |
| 2014/0240313 A1 | 8/2014 | Varga | |
| 2015/0062291 A1 | 3/2015 | Kim et al. | |
| 2015/0304739 A1* | 10/2015 | Koehler | H04H 20/04 725/32 |
| 2015/0358594 A1 | 12/2015 | Marshall et al. | |
| 2016/0028949 A1 | 1/2016 | Lee et al. | |
| 2016/0132991 A1 | 5/2016 | Fukushi | |
| 2016/0142703 A1 | 5/2016 | Park et al. | |
| 2016/0253795 A1* | 9/2016 | Cole | G06T 5/006 345/426 |
| 2016/0269711 A1* | 9/2016 | Hwang | H04N 13/30 |
| 2016/0282619 A1 | 9/2016 | Oto et al. | |
| 2016/0314818 A1 | 10/2016 | Kirk et al. | |
| 2016/0337612 A1* | 11/2016 | Im | G06T 19/006 |
| 2017/0280196 A1* | 9/2017 | Thomas | H04N 21/4532 |

OTHER PUBLICATIONS

Gyarmati et al.; "Analyzing In-Game Movements of Soccer Players at Scale"; MIT Sloan Sports Analytics Conference; Mar. 11-12, 2016, Boston, Massachusetts, USA; 14 pages.

Wang et al.; "Classifying NBA Offensive Plays Using Neural Networks"; MIT Sloan Sports Analytics Conference; Mar. 11-12, 2016, Boston, Massachusetts, USA; 9 pages.

Harmon et al.; "Predicting Shot Making in Basketball Learnt from Adversarial Multiagent Trajectories"; http://www.arxiv-sanity.com/1609.04849; 9 pages.

Kalal et al.; "Tracking-Learning-Detection"; IEEE Transactions on Pattern Analysis and Machine Intelligence; vol. 6 No. 1; Jan. 2010; 14 pages.

Duong, T.D.; "Applying Machine Learning Methods to Improve Player's Behaviors in Robocup Soccer Simulation"; MSc Information System; University of Leeds, School of Computing; 2003/2004; 69 pages.

ISA/KR, "International Search Report and Written Opinion of the International Searching Authority," International Application No. PCT/KR2018/003334, dated Jul. 12, 2018, 11 pages.

* cited by examiner

US 10,687,119 B2

SYSTEM FOR PROVIDING MULTIPLE VIRTUAL REALITY VIEWS

CROSS-REFERENCE TO RELATED APPLICATION AND CLAIM OF PRIORITY

This application claims priority under 35 U.S.C. § 119(e) to U.S. Provisional Patent Application No. 62/525,654 filed on Jun. 27, 2017, titled "System and Method for Content Display." The above-identified provisional patent application is hereby incorporated by reference in its entirety.

TECHNICAL FIELD

This disclosure relates generally to systems for providing contents. More specifically, this disclosure relates to systems for providing contents using virtual reality (VR) devices.

BACKGROUND

Most events, such as concerts, musicals, stage performances, sports (e.g., soccer, football, baseball, hockey, basketball, etc.), etc., are recorded with multiple cameras. A producing team composes a single stream out of those available video streams in real time, and users watch the composed stream. There is a need for user controlled content streams.

SUMMARY

In one embodiment, a VR client embodiment, an electronic device provides for live virtual reality events. The electronic device includes a display, a transceiver, a processor operatively coupled to the transceiver, and a memory operatively coupled to the processor. The memory stores instruction that, when executed, cause the processor to receive, from a contents server via the transceiver, a first stream of a first 360° video taken from a first location at a venue, and a second stream of a second non-360° video extracted from a second 360° video taken from a second location at the venue. The instructions further cause the processor to render a thumbnail of the second non-360° video at a selected position on frames of the first 360° video, wherein the selected position corresponds to the second location in relation to the first location; display, on the display or an external display, a portion the first 360° video with the rendered thumbnail; receives a selection of the rendered thumbnail from a user; transmit, to the contents server, the selection of the second non-360° video; and receives, from the contents server, a third stream of the second 360° video, and discontinue receiving the first stream of the first 360° video.

In a second embodiment, a method provides for operating an electronic device for live virtual reality events. The method includes receiving, from a contents server, a first stream of a first 360° video taken from a first location at a venue and a second stream of a second non-360° video extracted from a second 360° video taken from a second location at the venue. The method further includes rendering a thumbnail of the second non-360° video at a selected position on frames of the first 360° video, wherein the selected position corresponds to the second location in relation to the first location; displaying a portion of the first 360° video with the rendered thumbnail; receiving a selection of the rendered thumbnail from a user; transmitting, to the contents server, the selection of the second non-360° video; and receiving, from the contents server, a third stream of the second 360° video, and discontinuing receiving the first stream of the first 360° video.

In a third embodiment, a non-transitory medium embodying a computer program provides for live virtual reality events. The program code, when executed by at least one processor, causes a processor to receive, from a contents server, a first stream of a first 360° video taken from a first location at a venue and a second stream of a second non-360° video extracted from a second 360° video taken from a second location at the venue. The program code, when executed by at least one processor, further causes a processor to render a thumbnail of the second non-360° video at the selected position on frames of the first 360° video, wherein the selected position corresponds to the second location in relation to the first location; display the first 360° video with the rendered thumbnail; receive a selection of the rendered thumbnail from a user; transmit, to the contents server, the selection of the second non-360° video; and receive, from the contents server, a third stream of the second 360° video, and discontinue receiving the first stream of the first 360° video.

In a fourth embodiment, a system provides for live virtual reality events. The system includes a network interface, at least one processor coupled to the network interface, and at least one storage operatively coupled to the processor. The storage stores instructions that, when executed, cause the processor to receive, via the network interface, a first feed from a first camera of a first 360° video taken from a first location at a venue and a second feed from a second camera of a second 360° video taken from a second location at the venue. The instructions also cause the processor to extract a second non-360° video from the second 360° video; transmit, to an external electronic device via the network interface, a first stream of the first 360° video and a second stream of the extracted second non-360° video; receive, from the external electronic device, a selection of the second non-360° video; in response to the selection, transmit, to the external electronic device, a third stream of the second 360° video; and discontinue transmitting the first stream of the first 360° video.

In a fifth embodiment, a method provides for live virtual reality events. The method includes receiving a first feed from a first camera of a first 360° video taken from a first location at a venue and a second feed from a second camera of a second 360° video taken from a second location at the venue. The method further includes extracting a second non-360° video from the second 360° video; transmitting, to an external electronic device, a first stream of the first 360° video and a second stream of the extracted second non-360° video; receiving, from the external electronic device, a selection of the second non-360° video; in response to the selection, transmitting, to the external electronic device, a third stream of the second 360° video; and discontinue transmitting the first stream of the first 360° video.

In a sixth embodiment, a non-transitory medium embodying a computer program provides for live virtual reality events. The program code that, when executed, causes a processor to receive a first feed from a first camera of a first 360° video taken from a first location at a venue and a second feed from a second camera of a second 360° video taken from a second location at the venue. The program code that, when executed, further causes the processor to extract a second non-360° video from the second 360° video; transmit, to an external electronic device, a first stream of the first 360° video and a second stream of the extracted second non-360° video; receive, from the external electronic device, a selection of the second non-360° video; in response to the selection, transmit, to the external electronic device, a third stream of the second 360° video; and discontinue transmitting the first stream of the first 360° video.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
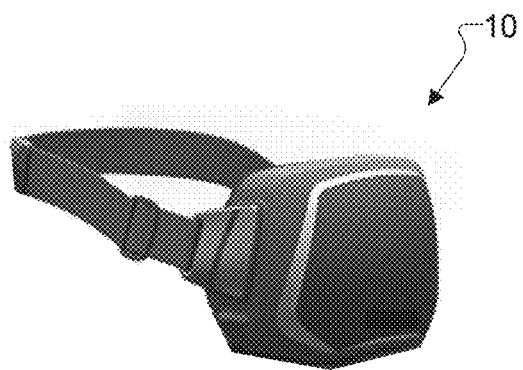
FIGS. 1A, 1B, and 1C illustrate example VR clients in which various embodiments of the present disclosure may be implemented.

FIGS. 1 through 10, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," ""an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to an embodiment of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Figure 1B:
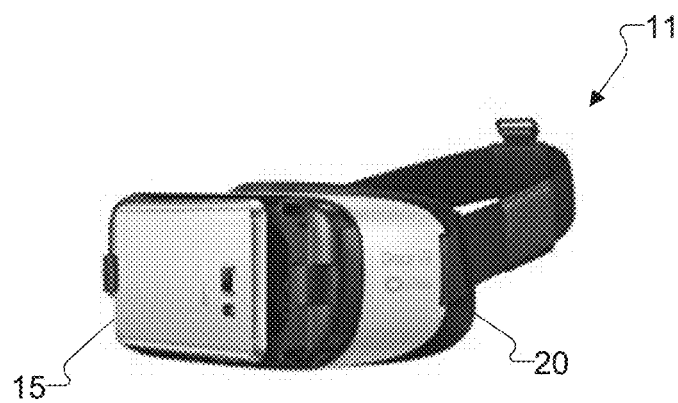
Figure 1C:
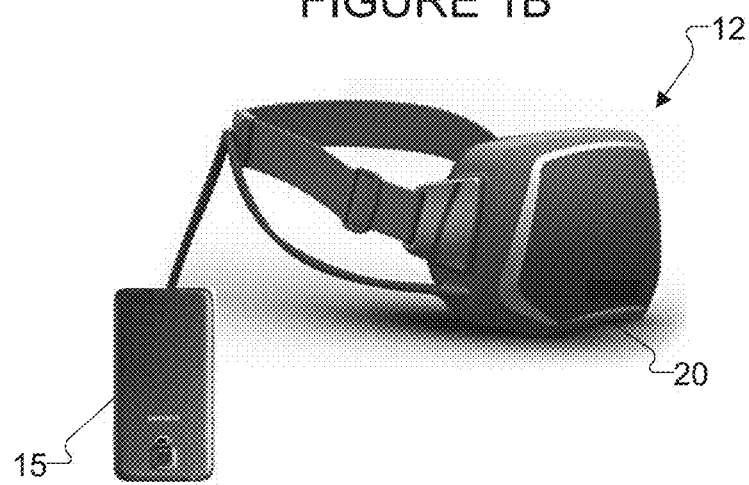

FIGS. 1A, 1B and 1C illustrate an example virtual reality (VR) client (alternatively referred to as "VR client devices," "VR devices," or "head-mounted displays (HMDs)") 10, 11 and 12 in which various embodiments of the present disclosure may be implemented. The embodiments of the VR clients 10, 11 and 12 illustrated in FIGS. 1A, 1B and 1C are for illustration only. FIGS. 1A, 1B and 1C do not limit the scope of this disclosure to any particular embodiment of an electronic device. The VR client can be one of a stand-alone VR client 10, a drop-in VR client 11, or a tethered VR client 12.

The stand-alone VR client 10 includes all of the components (for example, a processor, a memory, a display, and a wireless communication circuit) necessary receiving and rendering VR contents in a single unit. The stand-alone VR client 10 can receive at least one of an image, web content, video stream, audiovisual data, or media file (hereinafter, collectively referred to as "contents") through a transceiver, process the contents to be rendered in VR, using a processor, and display the rendered contents on a display.

The drop-in VR client 11 includes an electronic device 15 (which includes a processor, a memory, and a display) detachably mounted into an HMD device or frame 20 which does not includes a display. For example, the electronic device 15 can be a smartphone. The electronic device 15 can receive at least one content from a contents server and process the contents for viewing. The electronic device 15 is also used to display the processed contents, while being mounted in the HMD frame 20.

The tethered VR client 12 includes an HMD device 20 tethered to an electronic device 15. The HMD device 20 includes a display and a communication interface, but does not include a processor to process contents for VR. The electronic device 15 (for example, a smartphone or PC) is connected to the HMD device 20 via a cable, and provides processed contents to the HMD device 20. For example, the electronic device 15 receives contents from a content server, and processes the contents for VR. The electronic device 15 then provides the processed contents to the HMD device 20 for viewing.

Figure 2:
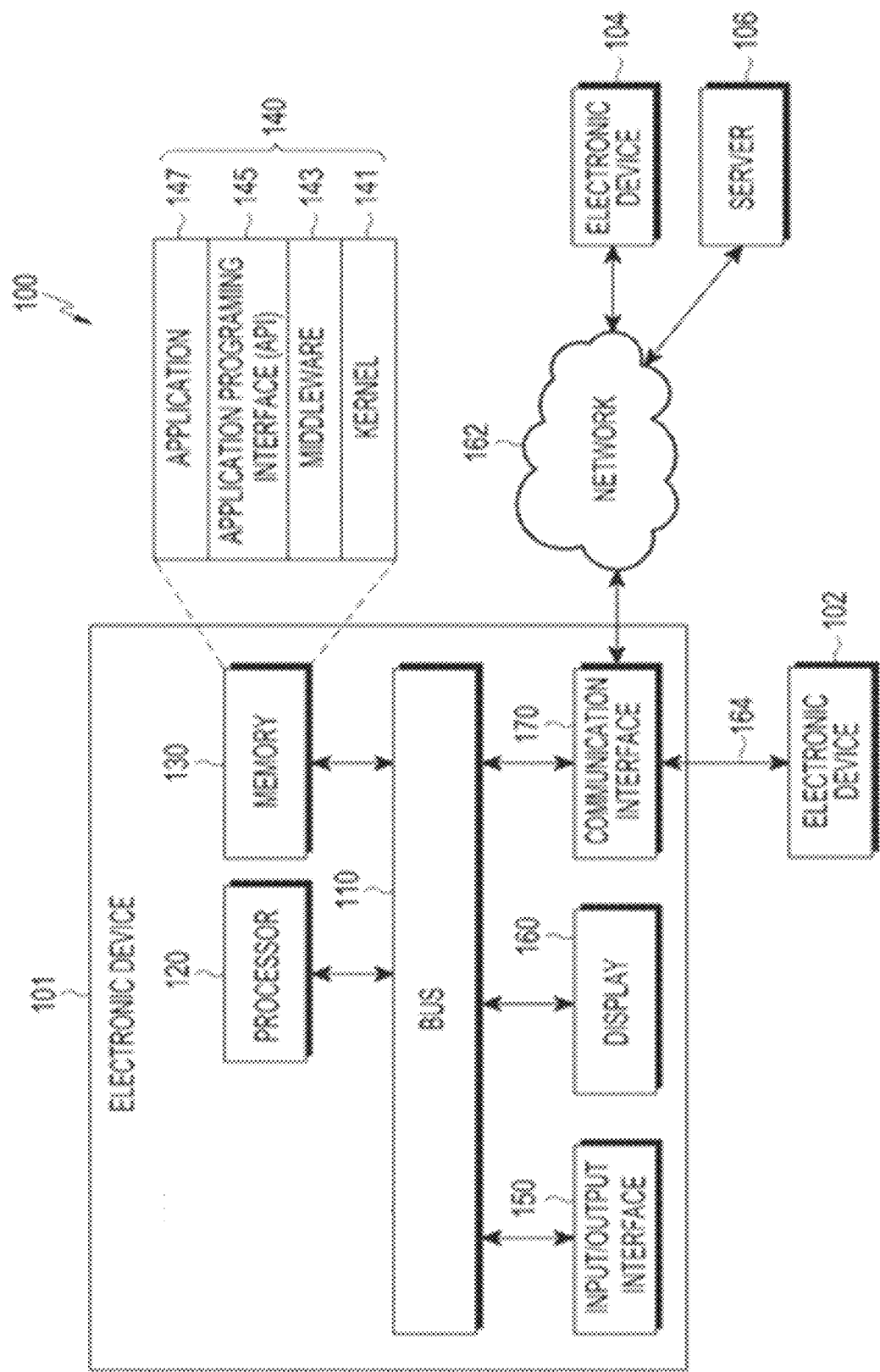
FIG. 2 illustrates an example network configuration according to embodiments of the present disclosure.

FIG. 2 illustrates an example network configuration 100 according to various embodiments of the present disclosure. The embodiment of the network configuration 100 shown in FIG. 2 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, or a communication interface 170. In some embodiments, the electronic device 101 may exclude at least one of the components or may add another component.

In certain embodiments, the standalone VR device 10 of FIG. 1A, the electronic device 15 of FIG. 1B, and the electronic device 15 of FIG. 1C can have the configuration of the illustrated electronic device 101. In another embodiment, the tethered type HMD device 20 of FIG. 1C can have the same or similar configuration as that of the electronic device 101 except that the tethered type device 20 does not include a processor (such as the processor 120 of FIG. 1C) that has full processing power to process VR contents.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 of the VR client 10 can determine a location for the received 360° video and each of received non-360° videos. The processor 120 of the VR client 10 can render a thumbnail for each of the non-360° videos. The processor 120 of the VR client 10 can position each of the rendered thumbnails in the 360° video for display to a user as an experience of a live event. The processor 120 of the contents server can convert the 360° videos to non-360° videos.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

The communication interface 170 of the VR client can receive multiple streams of 360° and non-360° video. The communication interface 170 of the VR client can transmit reference signals to indicate a primary video to be transmitted as 360° video from the contents server.

The communication interface 170 of the contents server can receive feeds from multiple cameras of 360° video and non-360° video. The communication interface 170 of the contents server transmits a stream of a primary video as 360° video and a second stream of secondary videos as non-360° videos.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to an embodiment of the present disclosure, the server 106 may include a group of one or more servers. According to an embodiment of the present disclosure, all or some of operations executed on the electronic device 101 can be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 1 01. The electronic device 101 can provide a requested function or service by processing the received result as it is or additionally. To that end, a cloud computing, distributed computing, or client-server computing technique may be used, for example.

Although FIG. 2 shows that the electronic device 101 includes the communication interface 170 to communicate with the external electronic device 104 or 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 2 illustrates one example of a communication system 100, various changes may be made to FIG. 2. For example, the system 100 could include any number of each component in any suitable arrangement. In general, computing and communication systems come in a wide variety of configurations, and FIG. 2 does not limit the scope of this disclosure to any particular configuration. While FIG. 2 illustrates one operational environment in which various features disclosed in this patent document can be used, these features could be used in any other suitable system.

Figure 3:
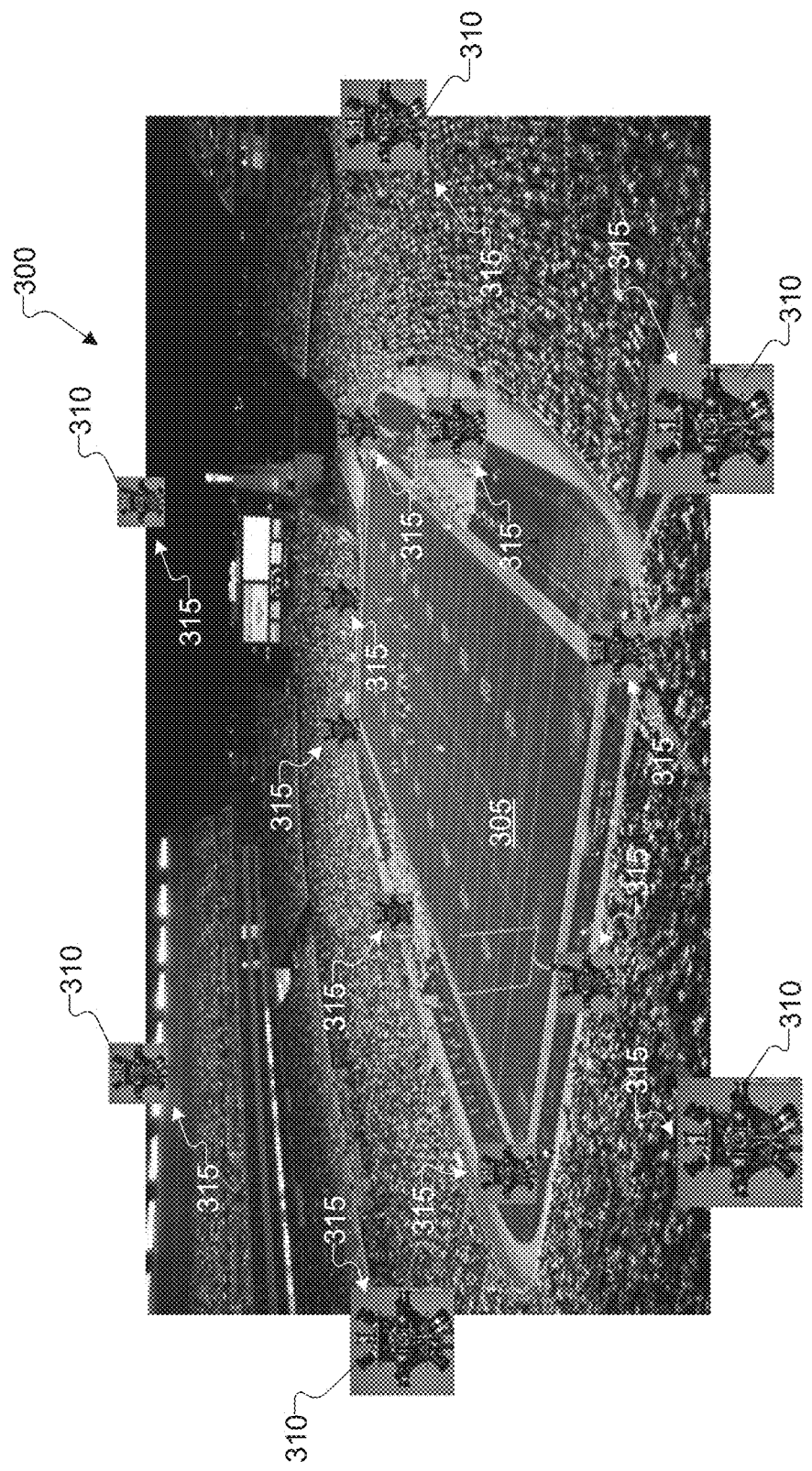
FIG. 3 illustrates an example event at a venue with multiple cameras according to embodiments of the present disclosure.

FIG. 3 illustrates an example event (a football game) 300 at a venue (a football stadium) 305 with multiple cameras 310 according to embodiments of the present disclosure. The embodiment of the event 300 illustrated in FIG. 3 is for illustration only. FIG. 3 does not limit the scope of this disclosure to any particular embodiment.

Examples of events could include, but are not limited to, concerts, plays, sports, musicals, stage performances, ceremonies, exhibitions, debates, or any other activities. Events can be held at different venues 305, such as a stadium, a field, an arena, a concert hall, a theater, an auditorium, etc. In addition, the embodiments of the present disclosure are not limited to certain events, but can be adapted to provide contents for various purposes, for example, viewing a building structure, a historical place, a construction site, a campus, or a park.

In the illustrated embodiment, the event 300 can be recorded, using a plurality of 360° cameras 310 at different locations 315 around the venue 305. Each of the 360° cameras can include multiple cameras facing different directions, and can be configured to stitch images from the multiple cameras. Each of the 360° cameras 310 can perform real-time stitching of images from its multiple cameras. The different locations 315 of the 360° cameras 310 provide different perspectives of the event 300.

In another embodiment, one or more of non-360° cameras 310 can be used for recording the event 300 either alone or in combination with the 360° cameras. In one example, such a non-360° camera can include only a single camera with a selected range of field of view. In another example, a non-360° camera can include multiple cameras facing a selected range of directions, and stitch images from the multiple cameras, thereby providing a field of view that is greater than that of a single camera, but is smaller than that of a 360° camera.

In certain embodiments, the 360° cameras 310 can include enough cameras to capture the relevant portions of the venue 305. For example, a 360° camera 310 located on an outer boundary of the venue 305 may not include cameras facing outside the venue 305. In certain embodiments, each 360° camera is programmed to limit the range of view of the user to the inside of the venue 305 or the portion of the venue 305 in which the event 300 is being performed.

Figure 4:
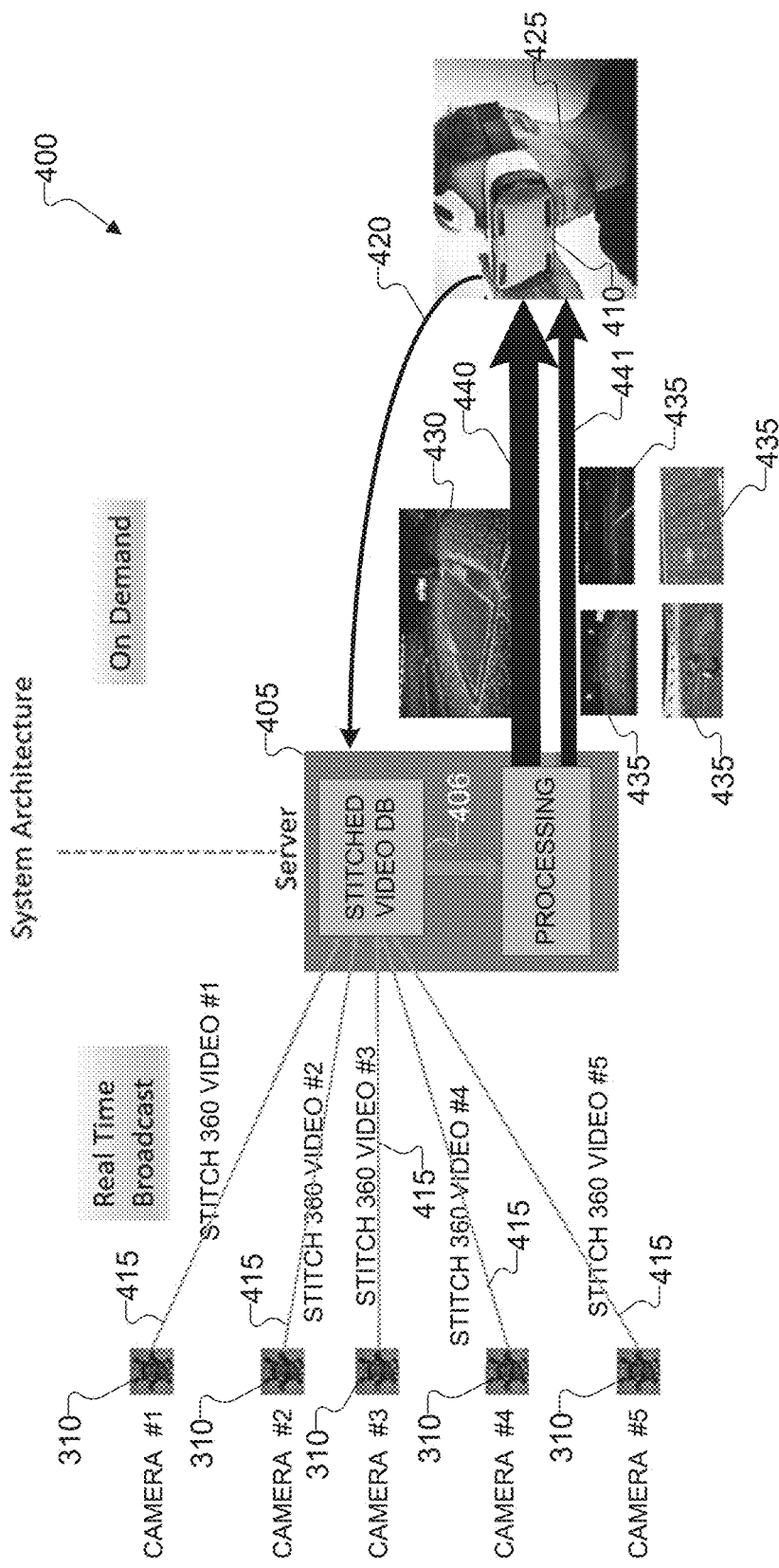
FIG. 4 illustrates an example architecture for a contents server receiving feeds from multiple cameras and providing output to a VR client according to embodiments of the present disclosure.

FIG. 4 illustrates an example architecture of a system 400 for a VR content service. The system 400 can include a VR contents server 405 receiving feeds from multiple cameras 310 and providing output to a VR client 410 according to embodiments of the present disclosure. The embodiment of the system 400 illustrated in FIG. 4 is for illustration only. FIG. 4 does not limit the scope of this disclosure to any particular embodiment.

The stitched 360° degree videos are provided as feeds 415 from the cameras 310 to a stitched-video database 406 of the server 405. Upon an operator or user's request via the VR client 410, the server 405 can process and provide a first stream 440 of 360° video 430 to the VR client 410. The VR client 410 can process the video 430 for rendering in VR, and display the rendered video 430 on its display or an associated display. In certain embodiments, the video 430 can be a default video for a certain type of event. In another embodiment, the server 405 may receive a selection 420 from an operator or user 425 via the VR client 410 to stream a selected event 300 or one of the stitched 360° videos to the VR client 410 to be rendered as a 360° video 430 in a first stream 440.

By default or optionally, the server 405 can also provide at least one second stream 441 of snapshots or non-360° video (such as those described with reference to FIG. 3) 435 to the VR client 410. The VR client 410 can render the snapshots or non-360° videos 435 as thumbnails within the 360° video 430 for viewing. The thumbnails can be positioned within the 360° video 430 at locations corresponding to the physical locations of the cameras that take the snapshots or videos for the thumbnails. In one embodiment, the server 405 can provide the VR client 410 with metadata indicative of such locations, and the VR client 410 can use the metadata for rendering the thumbnails at specific locations.

In other embodiments, the server 405 can also provide the VR client 410 with a venue map, a list of cameras at the venue, a list of starting point options (such as broadcaster view, object of interest view, full venue view, and the like), and so forth.

In addition, the VR client 410 can also provide a user interface to select one of the thumbnails. The user interface can be implemented, using, for example, at least one of voice recognition, a touch pad on the VR client 410, hand-gesture recognition, eye gaze detection, head tracking, or a handheld controller.

As described above, in the illustrated embodiment, the streamed 360° video 430 can be rendered at the VR client 410 in combination with other preview non-360° videos 435 as thumbnails or frames from different locations at the event 300 providing alternative perspectives. In certain embodiments, the server 405 can process and provide the VR client 410 with a combined video including a 360° video with thumbnails of snapshots or non-360° videos. The VR client 410 can simply render the combined video for VR and display the rendered video without separately processing such snapshots or non-360° videos.

In certain embodiments, the second stream 441 can contain 360° or non-360° videos. In such embodiments, the VR client 410 can further process the videos (for example, extracting portions of the videos) to generate thumbnails of snapshots or frames. The thumbnails of the non-360° video 435 may be located at the corresponding originating location 315 at the event 300 of the perspective, using metadata as described above or using image recognition and/or machine learning technique.

In certain embodiments, the second stream(s) 441 of the non-360° videos 435 is provided by the server 405 at a lower frame rate or resolution than the 360° video 430 in the first stream 440 to the VR client 410. Certain embodiments include providing a separate viewing area for the non-360° videos 435 overlaid and smaller than the streamed 360° video 430. The second stream 441 could also contain general feeds, such as a view of the broadcaster booth, a scoreboard, statistics page, etc. In certain embodiments, replay functionality can be utilized for all videos in unison, the 360° video 430, the non-360° videos 435, or a particular non-360° video 435.

In some embodiments, the server 405 may broadcast (as opposed to providing on-demand services) a 360° video from a default perspective as a first stream 440 and other videos or snapshots from different perspectives as a second stream 441. Then, upon the user's selection, the system 400 provides on-demand services.

In certain embodiments, a focus of the 360° video 430 automatically follows the action, a designated player, or other criteria specified by the contents server 405 or the VR client 410. In certain embodiments, for each non-360° video 435 in the second stream 441, a snapshot is generated every few seconds, such as, every n seconds, where 'n' is a predesignated period, i.e., 1, 2, 3, and so forth. In certain embodiments, 'n' may be a varying range. The snapshots may be broadcast in a second stream 441 to the VR client 410. The snapshot may be a small section of the 360° degree image, e.g., the center of an image, around a predesignated object, etc.

As described above, the VR client 410 can combine the 360° video 430 from the first stream 440 and the non-360° videos 435 from second stream(s) 441 and display the result on a display to a viewer. The viewer can perform actions such as adjusting the field of view, zooming in/out, selecting a non-360° video to change perspective of the live event, and the like. In addition, the audio from each stream can be different from video to video, such that the user can have different sounds depending on a selection of a particular video by a thumbnail.

Figure 5:
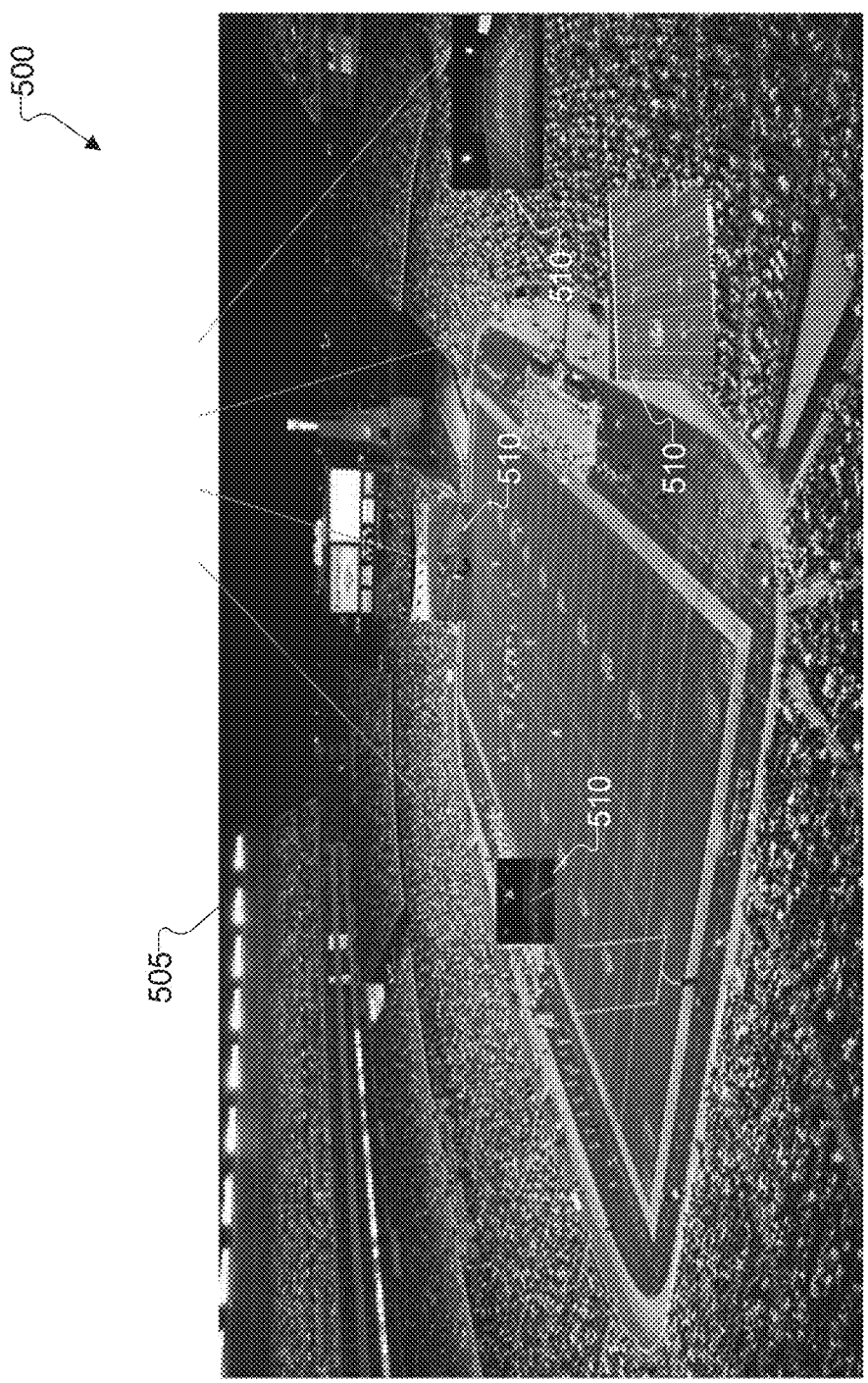
FIG. 5 illustrates an example broadcaster selectable view of a 360° video from a first camera with multiple non-360° videos positioned according to the location of the respective camera according to embodiments of the present disclosure.

FIG. 5 illustrates an example broadcaster selectable view 500 of a 360° video from a first camera with multiple thumbnails of non-360° videos or snapshots positioned according to the location of the respective camera according to embodiments of the present disclosure. The embodiment of the broadcaster selectable view 500 illustrated in FIG. 5 is for illustration only. FIG. 5 does not limit the scope of this disclosure to any particular embodiment.

In certain embodiments, the main screen is a broadcaster selectable view 500, which changes based on the broadcaster's camera selection. The broadcaster selectable view 500 includes a 360° video 505 and at least one non-360° video 510. This may still offer a viewer the selection of one of the different perspectives based on the corresponding thumbnails of the non-360° videos 505. Each non-360° video 510 is selectable by the user to switch to as a new 360° video. When a non-360° video 510 is selected, the origin of the 360° video 505 is switched to the corresponding camera location and the converted non-360° video and the other non-360° videos are placed in the new 360° video accordingly. Alternatively, upon selecting one of the thumbnails, the VR client can show only a full VR screen of the selected view without thumbnails.

Figure 6:
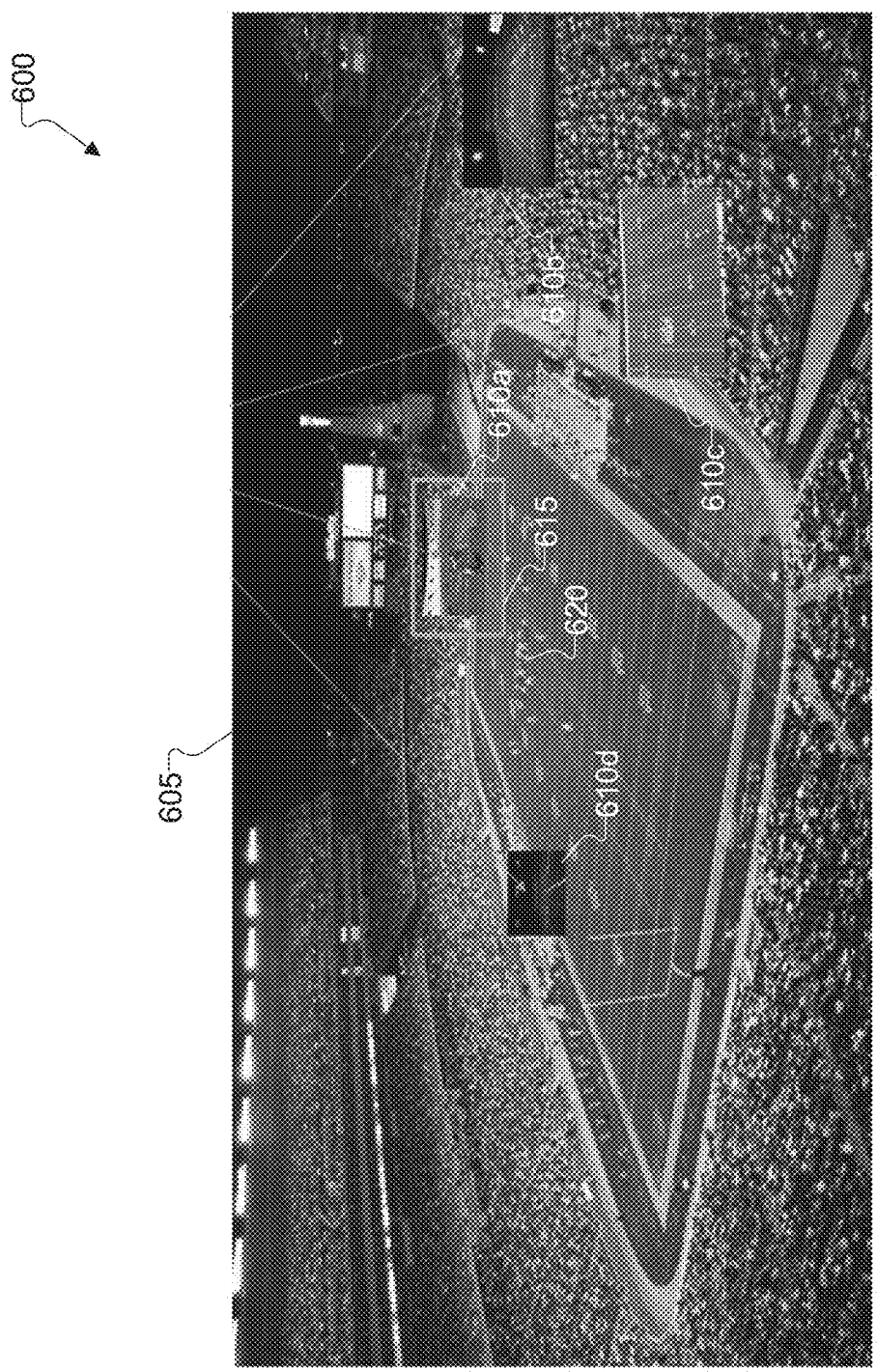
FIG. 6 illustrates an example experience with a recommended preview according to embodiments of the present disclosure.

FIG. 6 illustrates an example screen illustrating a user experience (UX) 600 with a recommended preview 615 according to embodiments of the present disclosure. The embodiments of the experience 600 illustrated in FIG. 6 is for illustration only. FIG. 6 does not limit the scope of this disclosure to any particular embodiment.

The UX 600 includes a 360° video 605 and at least one non-360° video 610a-610d. A recommend preview 615 is provided in the UX 600 to indicate a suggested non-360° video 610a for the user to potentially select as the primary stream to view as the new 360° video. The recommended preview 615 differentiates the suggested non-360° video 610a from the not suggested non-360° videos 610b. The recommended preview 615 can be displayed as a shape (such as a box) or a border around the suggested non-360° video 610a, increasing the brightness or visibility of the suggested non-360° video 610a or decreasing the brightness of the other non-360° videos 160b, increasing the size of the suggested non-360° video 610a, display the suggested non-360° video 160a in color or the not suggested non-360° videos 610b in black and white, changing the shape of the suggested non-360° video 610a or the shapes of the not suggest non-360° videos 610b, display an icon or other markings on the suggested non-360° video 610a or icons and markings on the not suggested non-360° videos 610b, etc.

The recommended preview 615 may be based on an interesting occurrence, action, or other aspect of the event of interest to a viewer. In certain embodiments, machine learning may be used to determine the recommend preview 615 based on identifying an object or person of interest 620, such as, tracking an objective, such as a ball location, a player, and so forth. An object of interest 620 can also be identified on the 360° video 605 and each of the non-360° videos 610, identified on only the 360° video 605, or identified on the 360° video 605 and the suggested non-360° video 610a. In certain embodiments, the operations for the recommended preview 615 and/or tracking objects in a video (described below) can be performed at the server 405 (FIG. 4). In certain embodiments, such operations can be performed at least partially at the VR client 410.

The recommended preview 615 can be determined in comparison to only the non-360° videos 610 or in comparison to the current 360° video 605 and the non-360° videos 610. For example, the recommend preview 615 can indicate the best alternative view for the 360° video 605 or the best view in general. When the recommended preview 615 is indicating the best view in general, the recommend preview 615 would only appear when a non-360° video 610 is ranked higher based on factors related to the identified object(s) or a machine learning priority. Ranking factors could include distance from an object of interest, obstruction of the view of the object of interest, default views at certain times (such as a camera with a high view from the side of the court for tip off in a basketball game), positions of the object of interest, viewing multiple objects of interest (such as viewing the ball and the goal in soccer), types of objects of interest (such as viewing a fight over the puck in hockey), user preferences, etc.

Real-time information of a sports game can be learned using various machine learning and computer vision technologies. The information is utilized for snapshots and stream recommendations. For example, the position of a ball and players can be tracked with a combination of feature extraction, object recognition and optical flow. To identify and track a specific player, further processing is necessary. A player can be identified by face recognition and/or text extraction, such as, player name/number, team name, and so forth, from the player's uniform. Various machine learning techniques can be adapted for implementation for the process of performing the selection and highlighting of thumbnails, such as track-learning detection, motion-based multiple object tracking, analyzing in-game movements of players at scale, predicting shot making in basketball learnt from adversarial multi-agent trajectories, classifying plays using neural networks, etc.

Figure 7:
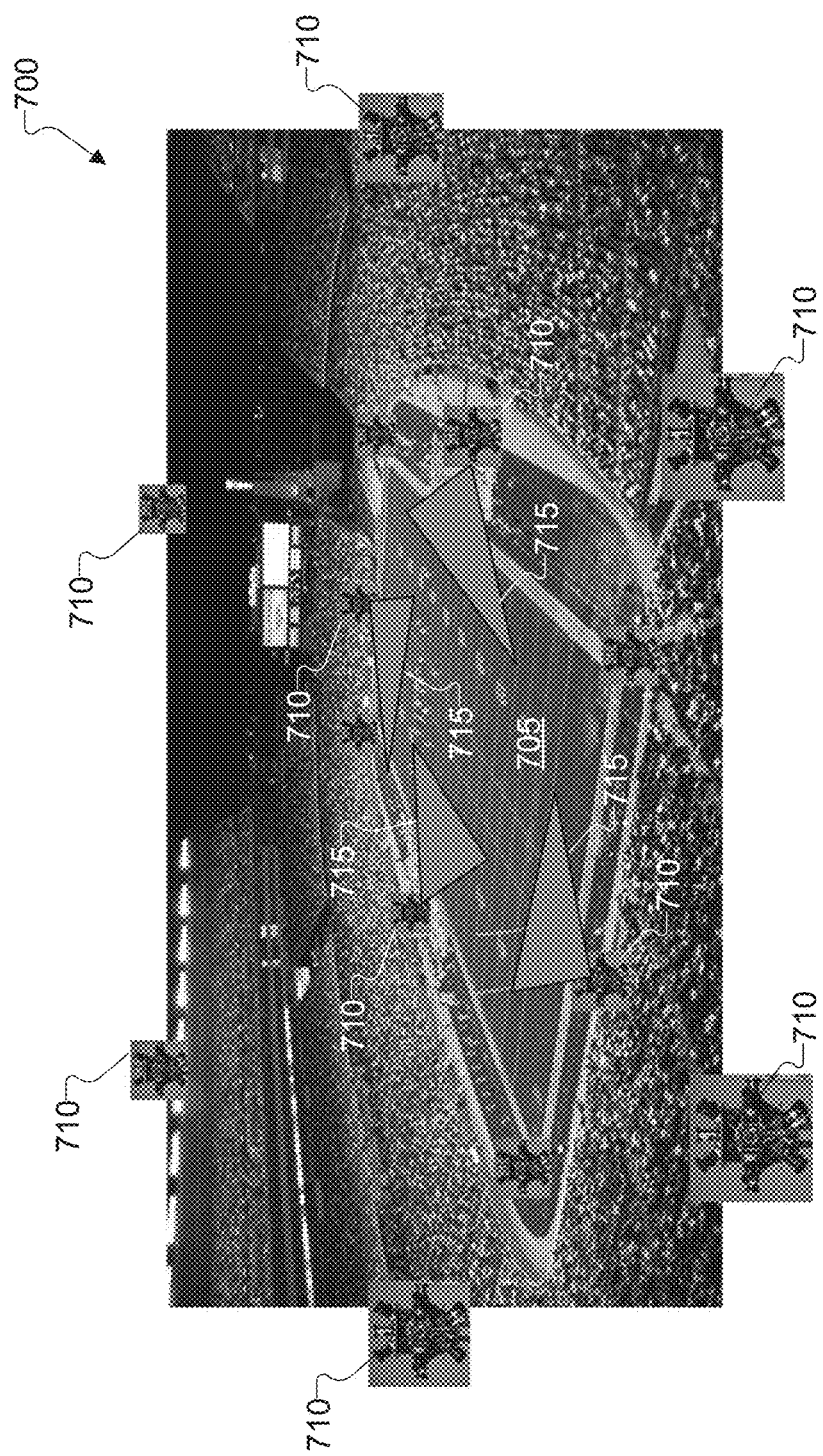
FIG. 7 illustrates an example default perspectives for each camera according to embodiments of the present disclosure.

FIG. 7 illustrates an example default perspectives 715 for each camera 710 according to embodiments of the present disclosure. The embodiment of the system 700 illustrated in FIG. 7 is for illustration only. FIG. 7 does not limit the scope of this disclosure to any particular embodiment.

The thumbnails can be based on these default perspectives. In another embodiment, at least one of the thumbnails may be based on a selection of a field of view 715, amount of zoom, and the like. Machine learning may be utilized to calculate the angles for different cameras.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

Figure 8:
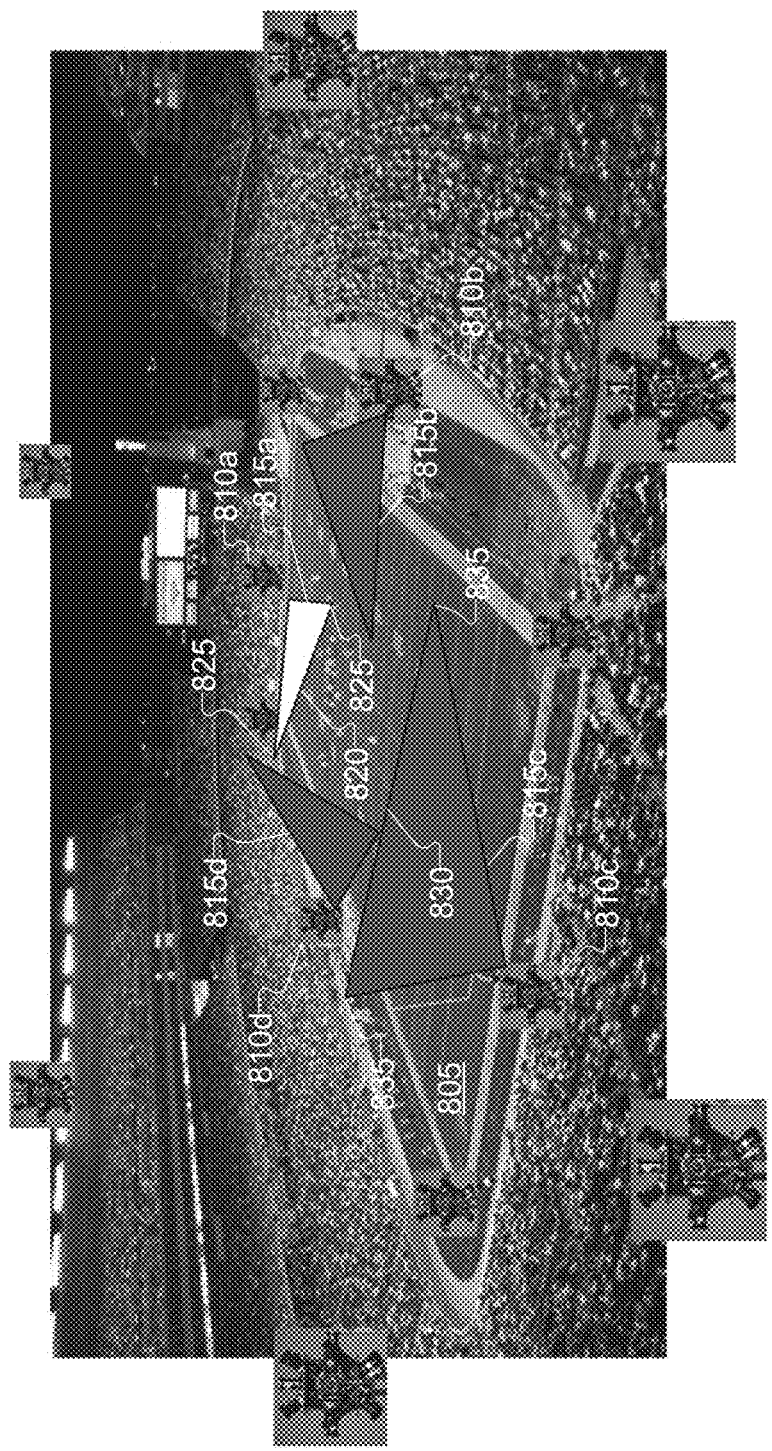
FIG. 8 illustrates an example focusing the default perspectives of the secondary cameras based on a focus of a primary camera according to embodiments of the present disclosure.

FIG. 8 illustrates an example method of changing the perspectives 815a-815d of the cameras 810a-810d for thumbnail views according to embodiments of the present disclosure. The embodiment of the changing the perspectives illustrated in FIG. 8 is for illustration only. FIG. 8 does not limit the scope of this disclosure to any particular embodiment.

The venue 805 includes a plurality of cameras 810a-810d, which can be programmed to focus the respective perspectives 815a-815d on a moving or static focal point 820 by default or selected by the operator or user. The non-360° videos or snapshots for generating thumbnails may be based on these perspectives 815. In certain embodiments, the perspectives may be adjusted on the fly, based on a selection of a field of view, amount of zoom, and the like. Machine learning can be utilized to calculate the angles for different cameras 810. For example, the location of and distance to the focal point 820 is determined.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

Figure 9:
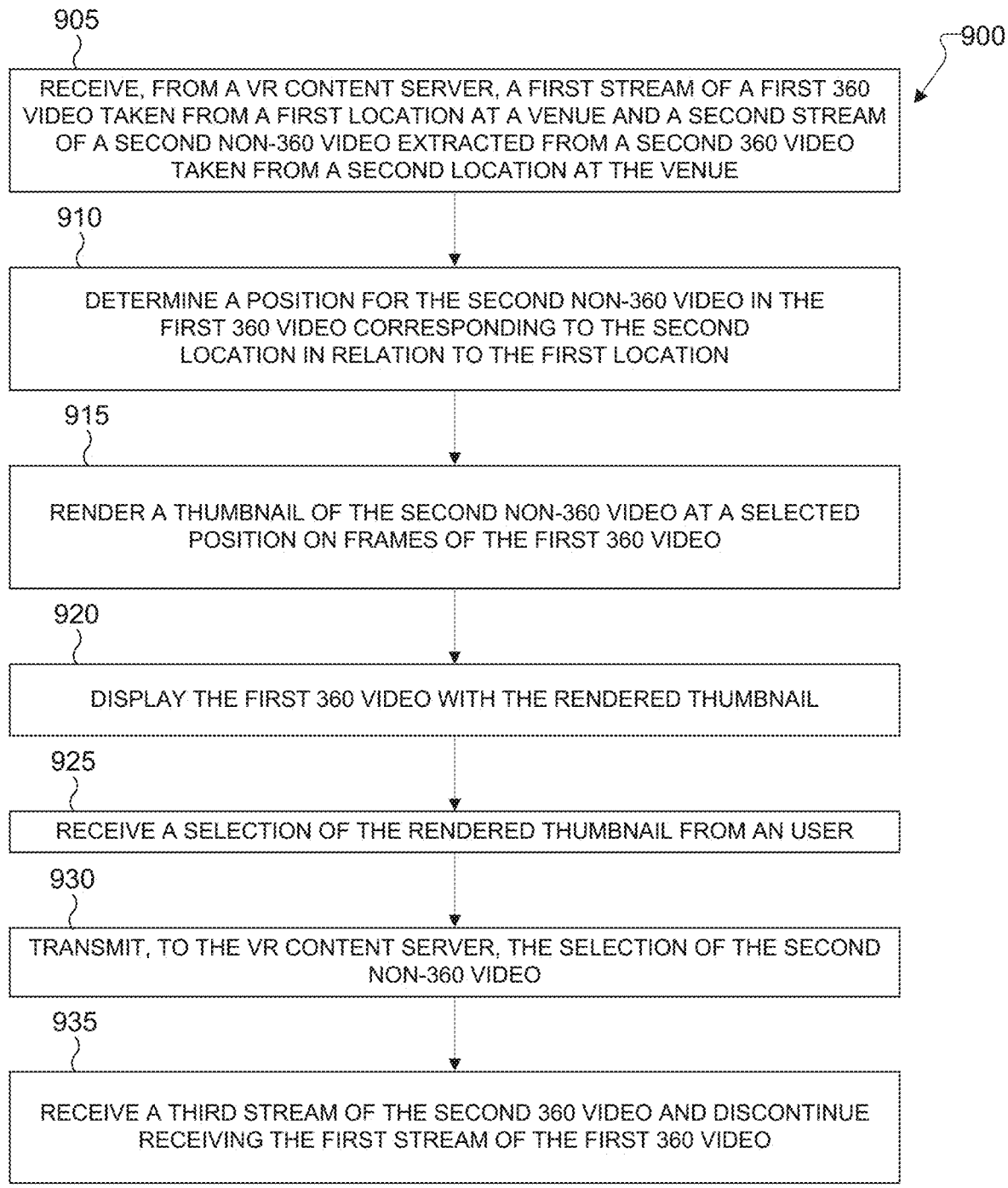
FIG. 9 illustrates an example process for live virtual reality events from a VR client according to embodiments of the present disclosure.

FIG. 9 illustrates an example process 900 for live virtual reality events from a VR client according to embodiments of the present disclosure. For example, the process 900 depicted in FIG. 9 can be performed by the VR clients 10, 11, and 12 in FIG. 1 or the VR client 410 in FIG. 4.

In operation 905, the VR client 410 receives, from a contents server, a first stream of a first 360° video taken from a first location at a venue or an event and a second stream of a second video taken from a second location at the venue of the event. The first 360° video is taken from one or more cameras at the first location. The first 360° video is received, from the contents server, stitched from the videos captured from the one or more cameras at the first location. A size of the first stream is larger than a size of the second stream, and a framerate for the first stream is larger than a framerate for the second stream.

The second stream can includes at least one non-360° video, which could be frames, snapshots, or a two dimensional video converted from each of the cameras at the venue that are not selected as the primary view. The VR client can generate a frame or snapshot from the second stream. The second stream includes non-360° video from each of the secondary cameras in the venue.

In operation 910, the VR client 410 determines a position for the second non-360° video in the first 360° video corresponding to the second location in relation to the first location, using, for example, metadata from the server. In some embodiments, the location can be determined based on information received from the contents server, such as GPS coordinates, a mapping of the location of the cameras in the venue, the contents server determining the positions or location based on the identifiers in the video, and the like. The location of the cameras can also be directly determined by the VR client using identifiers in the video or specialized markers attached to each camera in the venue and identifiable in the video.

In operation 915, the VR client 410 renders a thumbnail of the second non-360° video at a selected position in the first 360° video, where the selected position corresponds to second location in relation to the first location. The thumbnail can be generated at a reduced resolution from the non-360° video or can be generated at the contents server for the secondary non-360° videos transmitted in the second stream. A thumbnail can be generated at different time intervals to further reduce the bandwidth required in the second stream.

In operation 920, the VR client 410 displays a portion of the first 360° video with the rendered thumbnail. Each thumbnail is displayed at a position on the 360° video that relates to the location of the camera that captures the converted non-360° video related to the respective thumbnail. The first 360° video can be displayed on a display of the VR client 410.

The VR client 410 identifies an object of interest in the first 360° video. The VR client determines a recommended view as the second non-360° video. The VR client 410 differentiates the thumbnail of the second non-360° video from thumbnails of other non-360° videos on the display.

The VR client 410 identifies a focus of a primary perspective of the first 360° video. The VR client 410 determines a secondary perspective for the non-360° video based on the primary perspective. The VR client 410 causes the thumbnails to adjust based on the determined secondary perspectives.

In operation 925, the VR client 410 receives a selection of the rendered thumbnail from a user. The VR client 410 can track eye movements in combination with or separately from other physical inputs on the VR client 410. The selection can be based on a recommended preview. The recommended preview differentiates the suggest non-360° video from the not suggest non-360° videos that are displayed.

In operation 930, the VR client 410 transmits the selection of the second stream to the contents server 405. The selection indicates that the user wants to switch the selected non-360° video to the main perspective. The contents server is to switch the first stream to a second video that had been converted to the selected non-360° video and convert the first 360° video to a non-360° video in the second stream.

In operation 935, the VR client 410 receives a third stream of the second 360° video, and discontinues receiving the first stream of the first 360° video.

Although FIG. 9 illustrates an example process 900 for displaying various VR contents for an event at a VR client, various changes could be made to FIG. 9. For example, while shown as a series of steps, various steps in each figure could overlap, occur in parallel, occur in a different order, or occur multiple times.

Figure 10:
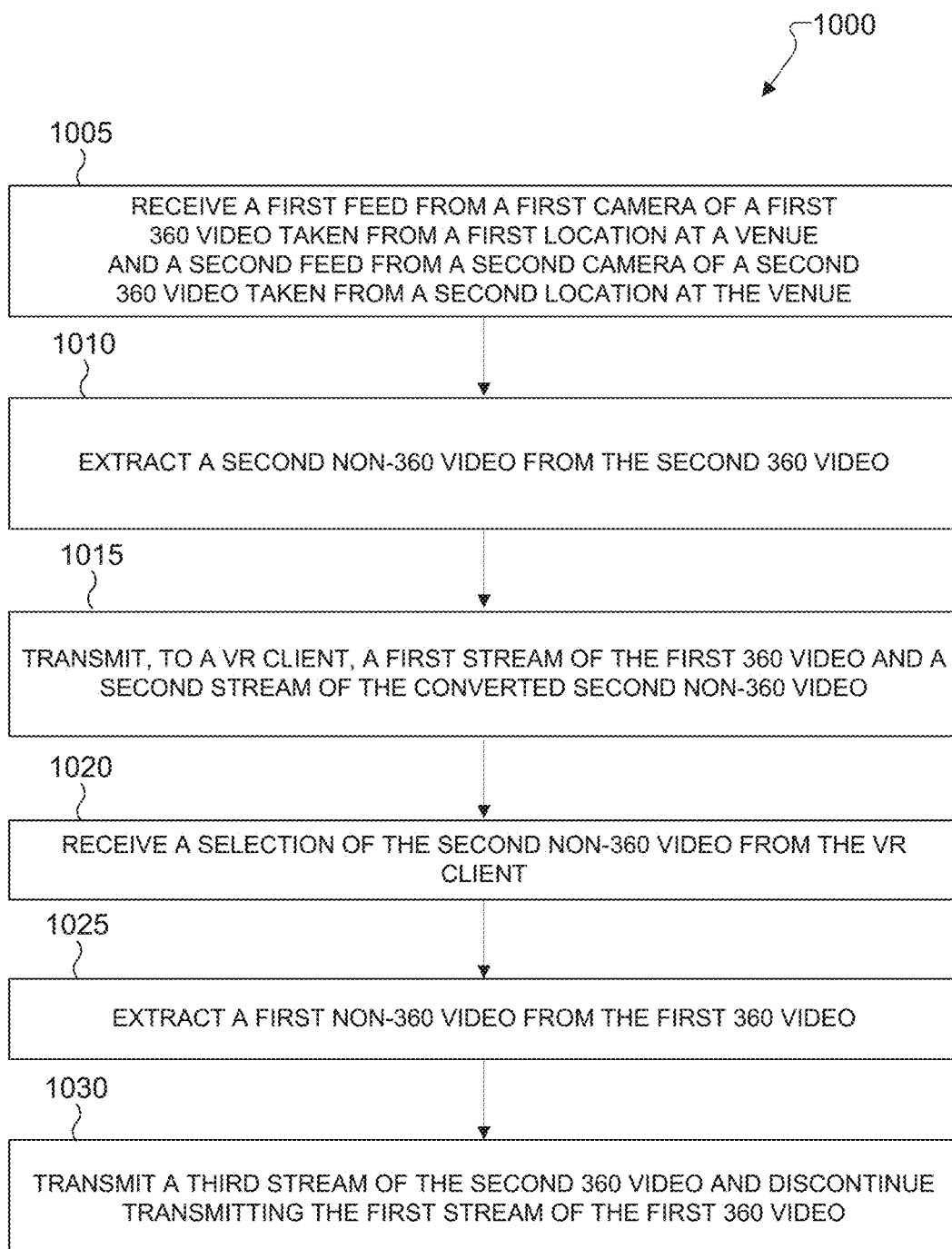
FIG. 10 illustrates an example process for live virtual reality events from a contents server according to embodiments of the present disclosure.

FIG. 10 illustrates an example process 1000 for providing VR contents at a contents server according to embodiments of the present disclosure. For example, the process 1000 depicted in FIG. 10 can be performed by the contents server 405 in FIG. 4.

In operation 1505, the contents server 405 receives a first feed from a first camera of a first 360° video taken from a first location at a venue or an event and a second feed from a second camera of a second 360° video taken from a second location at the venue or the event. The contents servers can receive feeds from a plurality of cameras. A primary 360° video is determined, for example, by a default setting for the venue, a default setting for the type of event, a historical user favored camera feed, a selection by a broadcaster of the event, analytics performed on the stream, amount of other users when the VR client connects to the event, a designated user or other VR client in proximity to the VR client 410, and the like. The primary 360° video is transmitted to the VR client 410 on a first stream 440.

In operation 1510, the contents server 405 can extract a second non-360° video(s) from the second 360° video(s). The contents server 405 can convert each of the camera feeds received into non-360° video(s) with the exception of the primary feed. The contents server 405 can generate frames, snapshots, or video from each of the non-360° videos.

In operation 1515, the server 405 transmits, to a VR client, the first 360° video in a first stream and the converted second non-360° video(s) in a second stream. The non-360° videos can be combined and transmitted on a second stream. Alternatively, multiple streams can be used for transmitting such non-360° videos. The second stream has a smaller size, or a smaller framerate than the first stream, or a combination thereof. The snapshots are recommended focal moments focal moments from the first 360° video and the second 360° video.

In certain embodiments, the contents server 405 can identify an object of interest in the first 360° video. The VR client 410 determines a recommended view as the second non-360° video. The contents server 405 can cause the VR client 410 to differentiate the thumbnail of the second non-360° video from thumbnails of other non-360° videos on the display.

In certain embodiments, the contents server 405 can identify a focus of a primary perspective of the first 360° video. The contents server 405 determines a secondary perspective for the non-360° video based on the primary perspective. The contents server 405 can cause the thumbnails to be adjusted based on the determined secondary perspectives.

In operation 1520, the contents server 405 receives a selection of the second non-360° video from the VR client 410. The selection can be based on a recommended preview 615. The recommended preview 615 differentiates the suggest non-360° video from the not suggest non-360° videos that are displayed.

Optionally, in operation 1525, the server 405 can extract a first non-360° video from the first 360° video. In operation 1530, the server 405 transmits a stream of the second 360° video and another stream of the extracted first non-360° video and other non-360° videos from different perspectives.

Although FIG. 10 illustrates an example process 1000 for live virtual reality events from a contents server, various changes could be made to FIG. 10. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   a transceiver;
   a processor coupled to the transceiver; and
   a memory coupled to the processor, the memory storing instructions that, when executed, cause the processor to:
      simultaneously receive, from another electronic device via the transceiver, a first stream of a first 360° video taken from a first location at a venue and a second stream of a non-360° video extracted from a second 360° video taken from a second camera at a second location at the venue,
      render a thumbnail of the non-360° video at a selected position on frames of the first 360° video corresponding to the second camera at the second location in relation to the first location,
      output to a display a portion of the first 360° video with the rendered thumbnail,
      receive an input selection of the rendered thumbnail through a user interface,
      transmit, to the other electronic device, the input selection of the non-360° video, and
      receive, from the other electronic device, a third stream of the second 360° video, and discontinue receiving the first stream of the first 360° video.

2. The electronic device of claim 1, wherein the second stream comprises periodically updated two-dimensional (2D) snapshots.

3. The electronic device of claim 2, wherein the 2D snapshots are recommended respective focal moments from the first 360° video and the second 360° video.

4. The electronic device of claim 1, wherein a first size for the first stream is larger than a second size for the second stream.

5. The electronic device of claim 1, wherein a first framerate for the first stream is larger than a second framerate from the second stream.

6. The electronic device of claim 1, wherein the instructions further cause the processor to:
receive information from the other device indicating a recommendation of the non-360° video; and
differentiate the thumbnail of the non-360° video from thumbnails of other non 360°-videos based on the received information.

7. The electronic device of claim 1, wherein the instructions further cause the processor to:
receive information from the other device indicating a secondary perspective for the non-360° video based on an object in a primary perspective of the first 360° video; and
adjust the thumbnail based on the secondary perspectives.

8. The electronic device of claim 1, further comprising:
the display, coupled to the processor; and
a frame including a structure to be worn on a user's head, a frame mounting the display in a position oriented towards a user's eyes when worn.

9. The electronic device of claim 1, wherein the output of the portion of the first 360° video with the rendered thumbnail is to an external display, via the transceiver.

10. A method for operating an electronic device, the method comprising:
simultaneously receiving, from another electronic device, a first stream of a first 360° video taken from a first location at a venue and a second stream of a non-360° video extracted from a second 360° video taken from a second camera at a second location at the venue;
rendering a thumbnail of the non-360° video at a selected position on frames of the first 360° video corresponding to the second camera at the second location in relation to the first location;
displaying a portion of the first 360° video with the rendered thumbnail;
receiving an input selection of the rendered thumbnail through a user interface;
transmitting, to the other electronic device, the input selection of the non-360° video; and
receiving, from the other electronic device, a third stream of the second 360° video, and discontinuing receiving the first stream of the first 360° video.

11. The method of claim 10, wherein the second stream comprises periodically updated two-dimensional (2D) snapshots.

12. The method of claim 11, wherein the 2D snapshots are recommended respective focal moments from the first 360° video and the second 360° video.

13. The method of claim 10, wherein a first size for the first stream is larger than a second size for the second stream.

14. The method of claim 10, wherein a first framerate for the first stream is larger than a second framerate from the second stream.

15. The method of claim 10, further comprising:
receiving information from the other device indicating a recommendation of the non-360° video; and
differentiating the thumbnail of the non-360° video from thumbnails of other non 360°-videos based on the received information.

16. The method of claim 10, further comprises:
receiving information from the other device indicating a secondary perspective for the non-360° video based on an object in a primary perspective of the first 360° video; and
adjusting the thumbnail based on the secondary perspectives.

17. A non-transitory computer readable medium embodying a computer program, the computer program comprising computer readable program code that when executed causes at least one processor to:
simultaneously receive, from another electronic device via a transceiver, a first stream of a first 360° video taken from a first location at a venue and a second stream of a non-360° video extracted from a second 360° video taken from a second camera at a second location at the venue;
render a thumbnail of the non-360° video at a selected position on frames of the first 360° video corresponding to the second camera the second location in relation to the first location;
output to a display a portion of the first 360° video with the rendered thumbnail;
receive an input selection of the rendered thumbnail through a user interface;
transmit, to the other electronic device, the input selection of the non-360° video; and
receive, from the other electronic device, a third stream of the second 360° video, and discontinue receiving the first stream of the first 360° video.

18. A system comprising:
a network interface;
a processor coupled to the network interface; and
a storage coupled to the processor, the storage including thereon instructions that, when executed, cause the processor to:
receive, via the network interface, a first feed from a first camera of a first 360° video taken from a first location at a venue and a second feed from a second camera of a second 360° video taken from a second location at the venue,
extract a non-360° video from the second 360° video,
simultaneously transmit, to an external device via the network interface, the first 360° video in a first stream and a second stream of the extracted non-360° video,
receive, from the external device, a selection of the non-360° video, and
transmit, to the external device, a third stream of the second 360° video and discontinue transmitting the first stream of the first 360° video in response to the selection.

19. The system of claim 18, wherein the second stream comprises periodically updated two-dimensional (2D) snapshots.

20. The system of claim 19, wherein the 2D snapshots are recommended focal moments from the first 360° video and the second 360° video.

21. The system of claim 18, wherein a first size for the first stream is larger than a second size for the second stream.

22. The system of claim 18, wherein a first framerate for the first stream is larger than a second framerate from the second stream.

23. The system of claim 18, wherein the storage further includes instructions which cause the processor to:
 identify an object of interest in the first 360° video;
 determine a recommended view as the non-360° video; and
 provide information to the external device indicating a recommendation of the non-360° video to differentiate a thumbnail of the non-360° video from thumbnails of other non-360° videos that are displayed.

24. The system of claim 18, wherein the storage further includes instructions which cause the processor to:
 identify a focus of a primary perspective of the first 360° video;
 determine a secondary perspective for the non-360° video based on the primary perspective; and
 provide information to the external device to adjust a thumbnail based on the determined secondary perspectives.

25. A method for a system comprising:
 receiving a first feed from a first camera of a first 360° video taken from a first location at a venue and a second feed from a second camera of a second 360° video taken from a second location at the venue;
 extracting a non-360° video from the second 360° video;
 simultaneously transmitting, to an external device via a network interface, the first 360° video in a first stream and a second stream of the extracted non-360° video;
 receiving, from the external device, a selection of the non-360° video; and
 transmitting, to the external device, a third stream of the second 360° video and discontinuing transmitting the first stream of the first 360° video in response to the selection.

26. The method of claim 25, wherein the second stream comprises periodically updated two-dimensional (2D) snapshots.

27. The method of claim 26, wherein the 2D snapshots are recommended focal moments from the first 360° video and the second 360° video.

28. The method of claim 25, wherein a first size for the first stream is larger than a second size for the second stream.

29. The method of claim 25, wherein a first framerate for the first stream is larger than a second framerate from the second stream.

30. The method of claim 25, further comprising:
 identifying an object of interest in the first 360° video;
 determining a recommended view as the non-360° video; and
 providing information to the external device indicating a recommendation of the non-360° video to differentiate a thumbnail of the non-360° video from thumbnails of other non-360° videos that are displayed.

31. The method of claim 25, further comprising:
 identifying a focus of a primary perspective of the first 360° video;
 determining a secondary perspective for the non-360° video based on the primary perspective; and
 providing information to the external device to adjust a thumbnail based on the determined secondary perspectives.

32. A non-transitory computer readable medium embodying a computer program, the computer program comprising computer readable program code that when executed causes at least one processor to:
 receive, via an interface, a first feed from a first camera of a first 360° video taken from a first location at a venue and a second feed from a second camera of a second 360° video taken from a second location at the venue,
 extract a non-360° video from the second 360° video,
 simultaneously transmit, to an external device via a network interface, the first 360° video in a first stream and a second stream of the extracted non-360° video,
 receive, from the external device, a selection of the non-360° video, and
 transmit, to the external device, a third stream of the second 360° video and discontinue transmitting the first stream of the first 360° video in response to the selection.

* * * * *